United States Patent
Kim et al.

(10) Patent No.: US 10,215,372 B2
(45) Date of Patent: Feb. 26, 2019

(54) CATENARY EQUIPMENT AND CONSTRUCTION METHOD THEREOF

(71) Applicant: SEHONG Co., Ltd., Yongin-si, Gyeonggi-do (KR)

(72) Inventors: Seong Chan Kim, Gunpo-si (KR); Won Mo Kang, Uiwang-si (KR)

(73) Assignee: SEHONG Co., Ltd., Yongin-si, Gyeonggi-do (KR)

( * ) Notice: Subject to any disclaimer, the term of this patent is extended or adjusted under 35 U.S.C. 154(b) by 244 days.

(21) Appl. No.: 15/431,791

(22) Filed: Feb. 14, 2017

(65) Prior Publication Data

US 2017/0254514 A1    Sep. 7, 2017

(30) Foreign Application Priority Data

Mar. 7, 2016  (KR) .................. 10-2016-0027065
Jan. 24, 2017  (KR) .................. 10-2017-0011285

(51) Int. Cl.
*F21V 15/04* (2006.01)
*F16M 13/02* (2006.01)
(Continued)

(52) U.S. Cl.
CPC ............ *F21V 15/04* (2013.01); *F16M 13/02* (2013.01); *F21S 8/068* (2013.01); *F21V 3/00* (2013.01);
(Continued)

(58) Field of Classification Search
CPC .......... F21V 15/04; F21V 23/023; F21V 3/00; F21V 21/008; F21S 8/068; F16M 13/02; F21Y 2103/10; F21Y 2115/10
See application file for complete search history.

(56) References Cited

U.S. PATENT DOCUMENTS 5,158,360 A * 10/1992 Banke .................. F21S 8/068
                                                362/391
7,147,346 B2 * 12/2006 Grimmeisen ............ F21S 8/06
                                                362/221
(Continued)

FOREIGN PATENT DOCUMENTS

KR        10-0597709 B1    11/2006
KR        10-1179903 B1     9/2012
KR     10-2014-0148065 A   12/2014

*Primary Examiner* — Anh T Mai
*Assistant Examiner* — Glenn D Zimmerman
(74) *Attorney, Agent, or Firm* — Revolution IP, PLLC

(57) ABSTRACT

Disclosed is a catenary equipment including a pillar unit which comprises a first pillar member and a second pillar member to be arranged at regular intervals; a horizontal wire which is horizontally arranged in between the first pillar member and the second pillar member; a horizontal-wire holder unit which comprises a first horizontal wire holder installed on the first pillar member, and a second horizontal wire holder installed on the second pillar member; a horizontal-vibration absorbing member which is arranged in between the horizontal wire and the first horizontal wire holder; a holding wire which holds the horizontal wire; a ceiling holder which is installed at a ceiling of the building; a connection bracket which connects a second end of the holding wire and the horizontal wire; and an earthquake-proof lighting equipment assembly which is installed on the horizontal wire.

20 Claims, 11 Drawing Sheets

(51) Int. Cl.
   *F21V 21/008* (2006.01)
   *F21V 3/00* (2015.01)
   *F21S 8/06* (2006.01)
   *F21V 23/02* (2006.01)
   *F21Y 115/10* (2016.01)
   *F21Y 103/10* (2016.01)

(52) U.S. Cl.
   CPC .......... *F21V 21/008* (2013.01); *F21V 23/023* (2013.01); *F21Y 2103/10* (2016.08); *F21Y 2115/10* (2016.08)

(56) References Cited

U.S. PATENT DOCUMENTS

| | | | |
|---|---|---|---|
| 7,832,907 B2 * | 11/2010 | Kotovsky | F21S 6/007 362/283 |
| 2015/0176821 A1 * | 6/2015 | Vogt | F21S 8/068 362/233 |
| 2015/0226391 A1 * | 8/2015 | Sellam | F21V 19/003 362/249.02 |

* cited by examiner

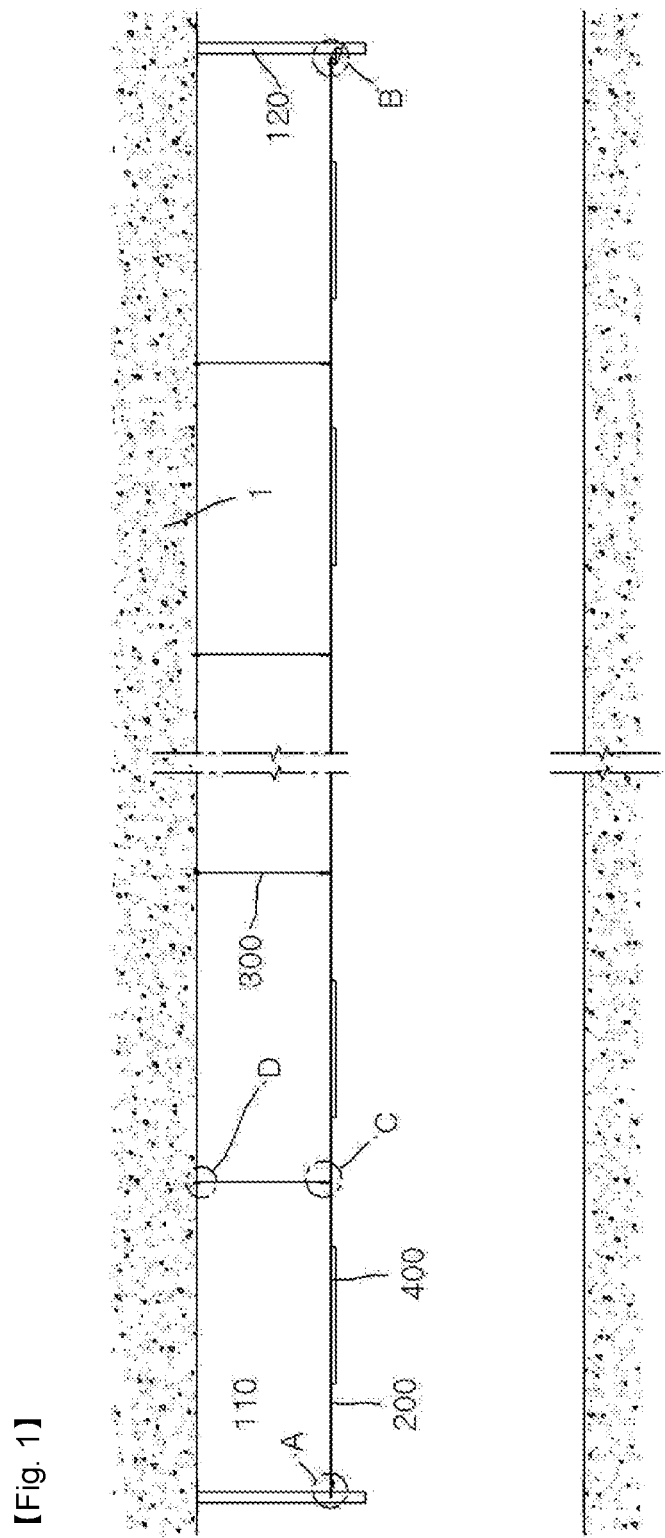
[Fig. 1]

[Fig. 2]
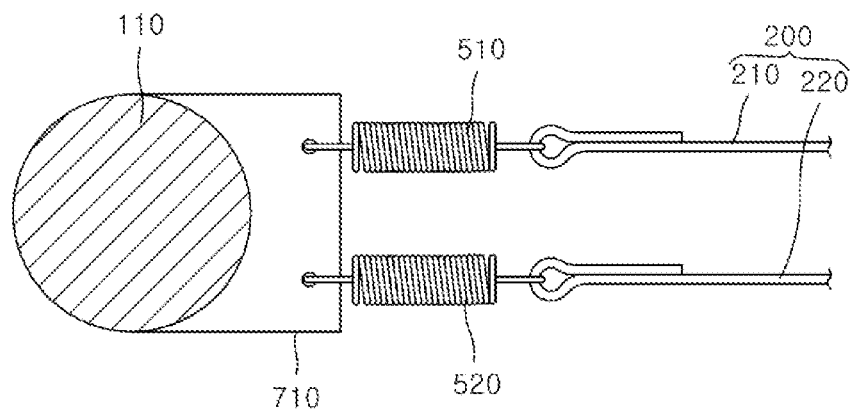
[Fig. 3]
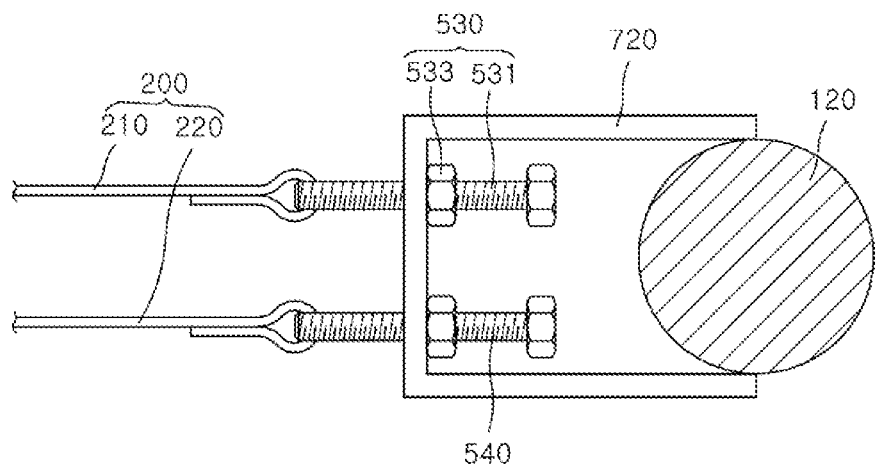

【Fig. 4】
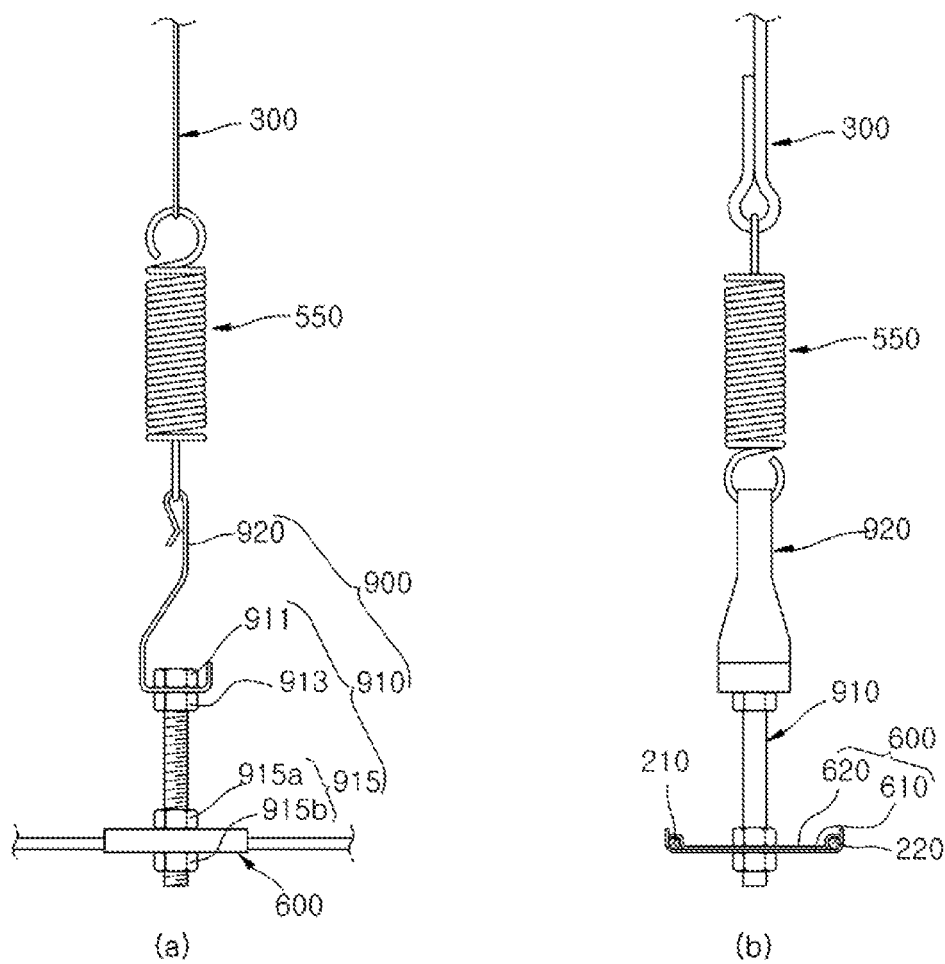

[Fig. 5]
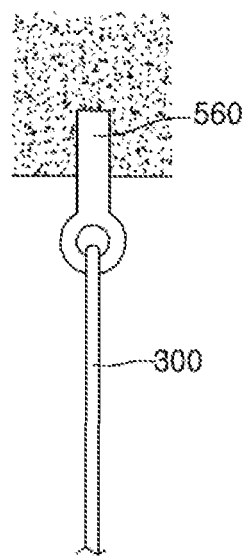
(a)
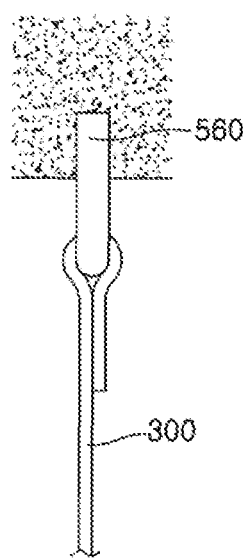
(b)

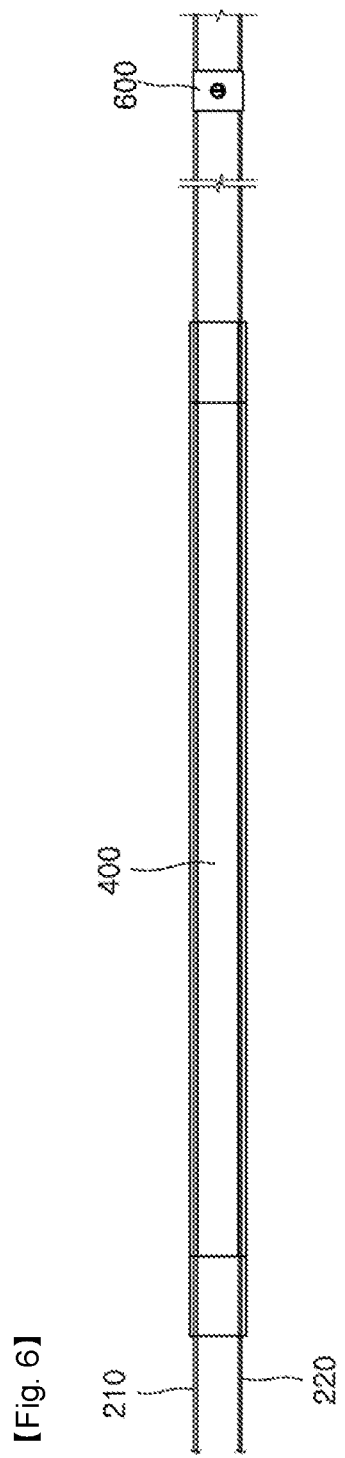

[Fig. 7]
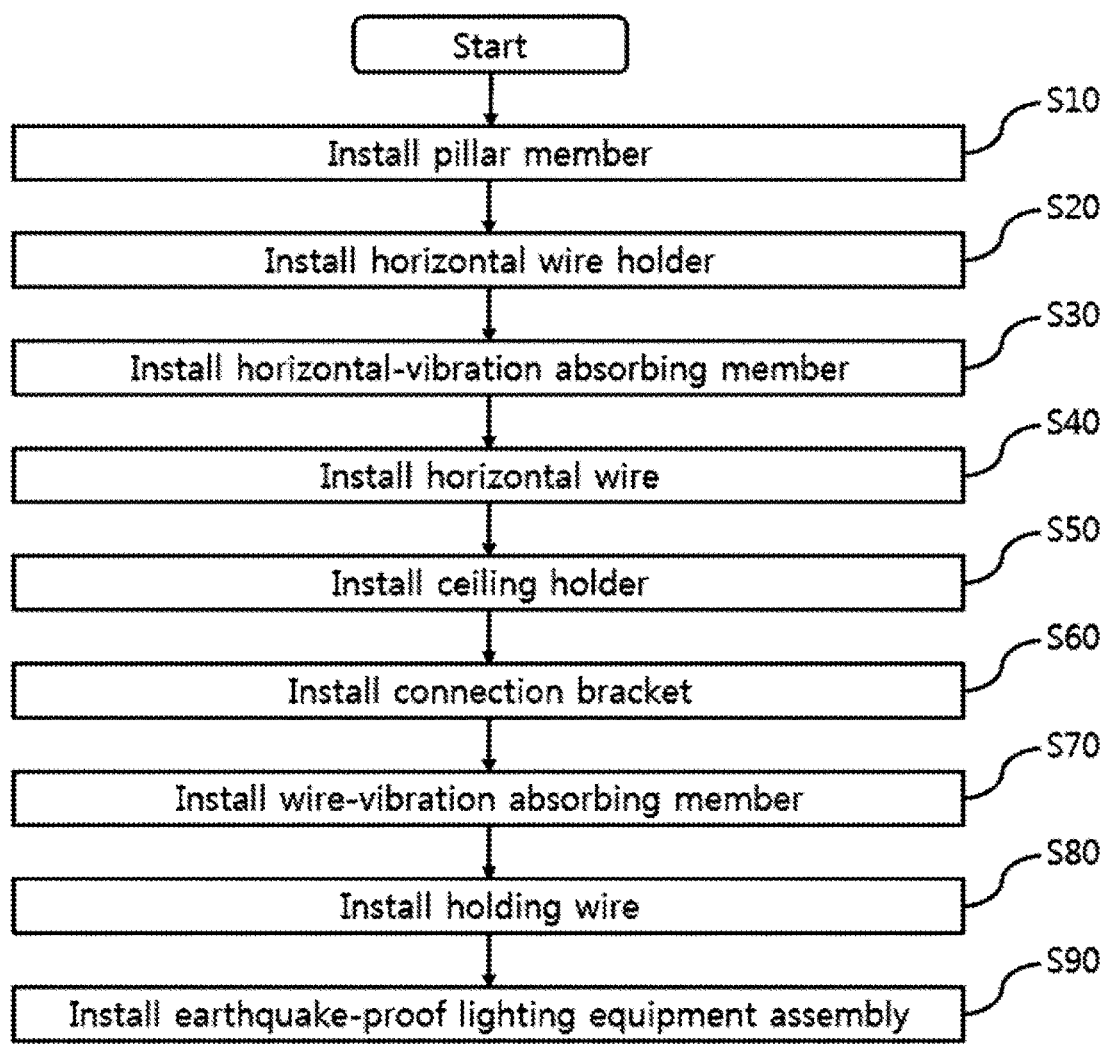

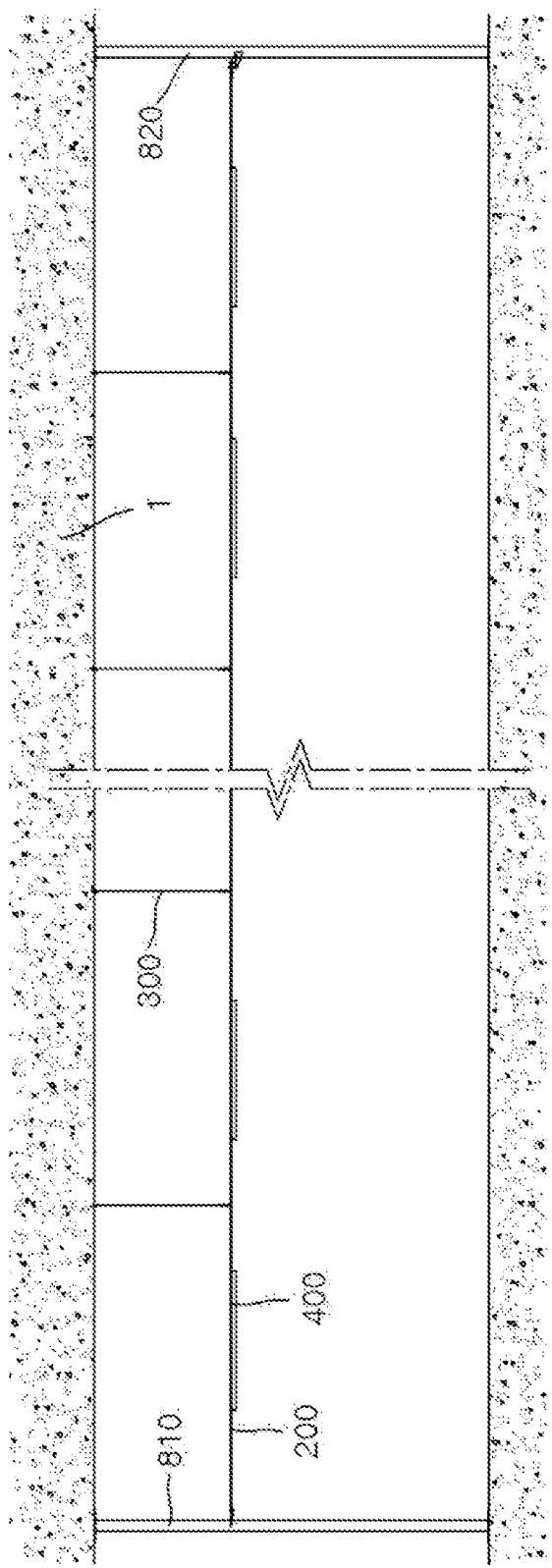
[Fig. 8]

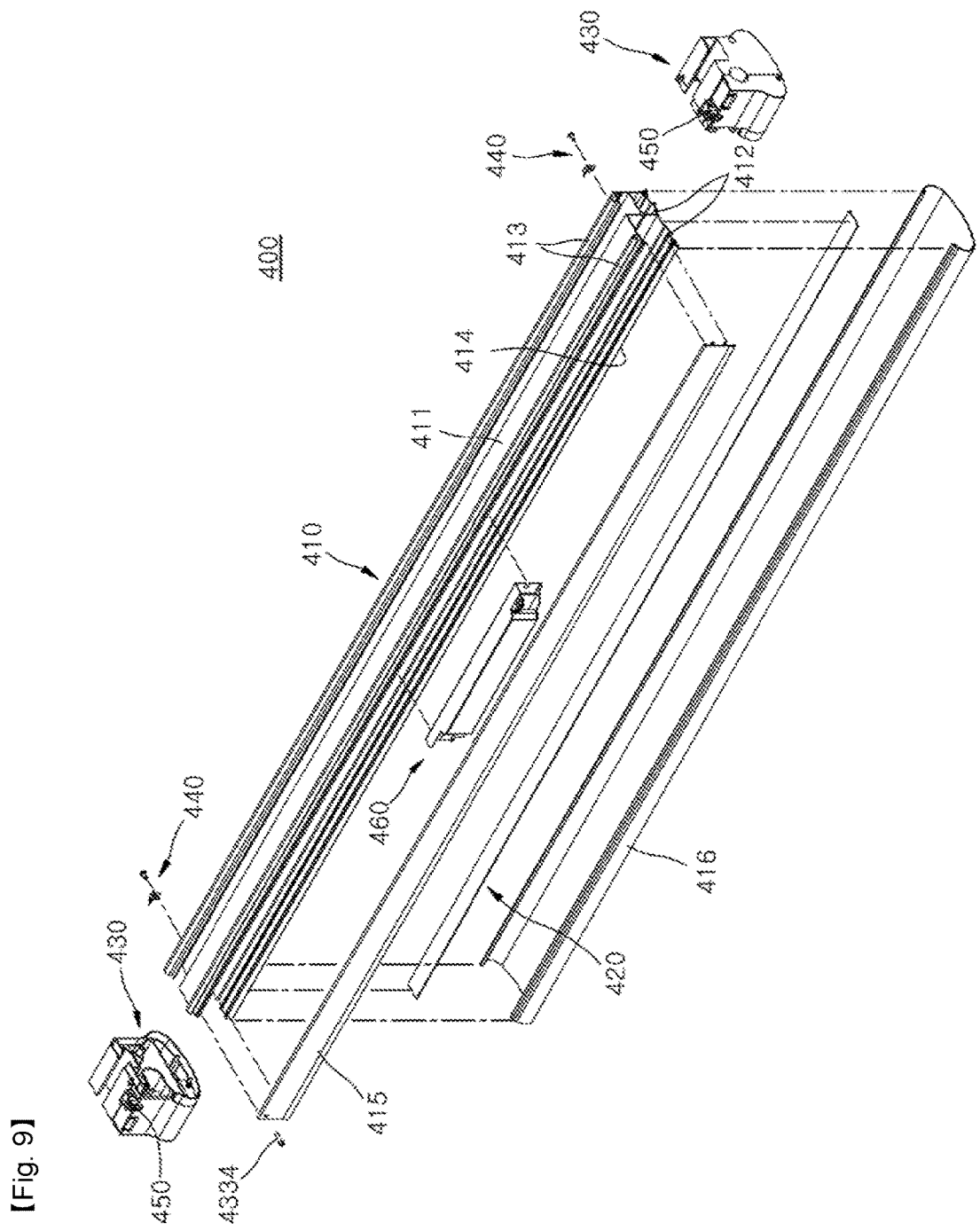
[Fig. 9]

[Fig. 10]
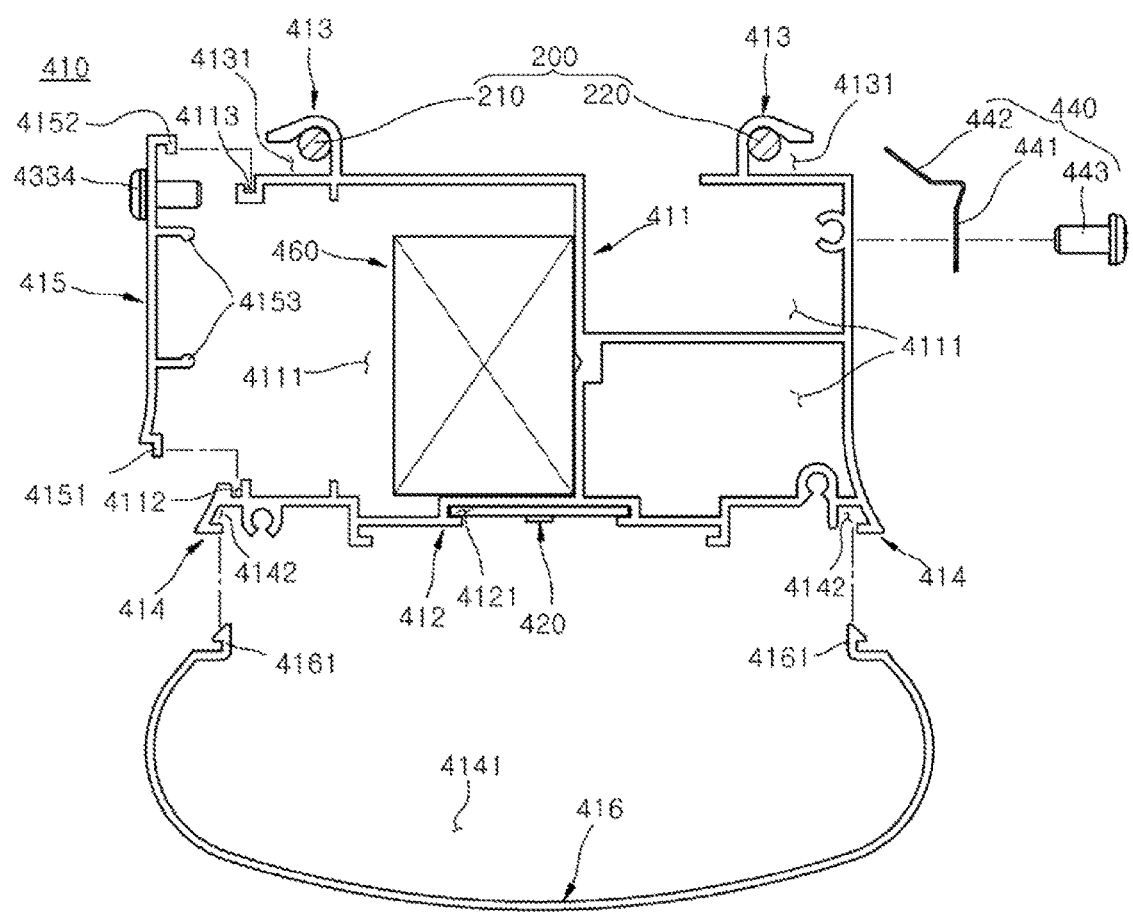

[Fig. 11]
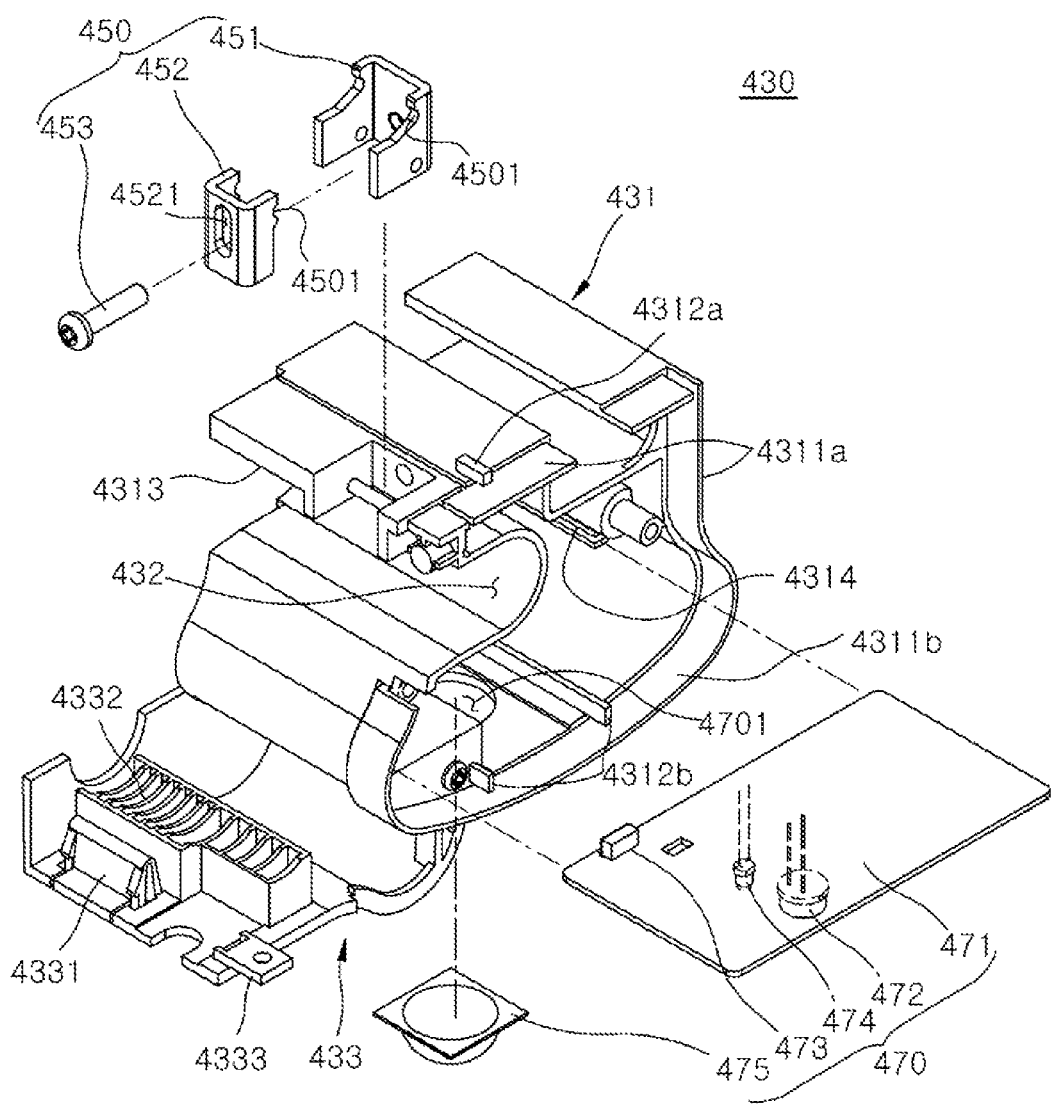

[Fig. 12]
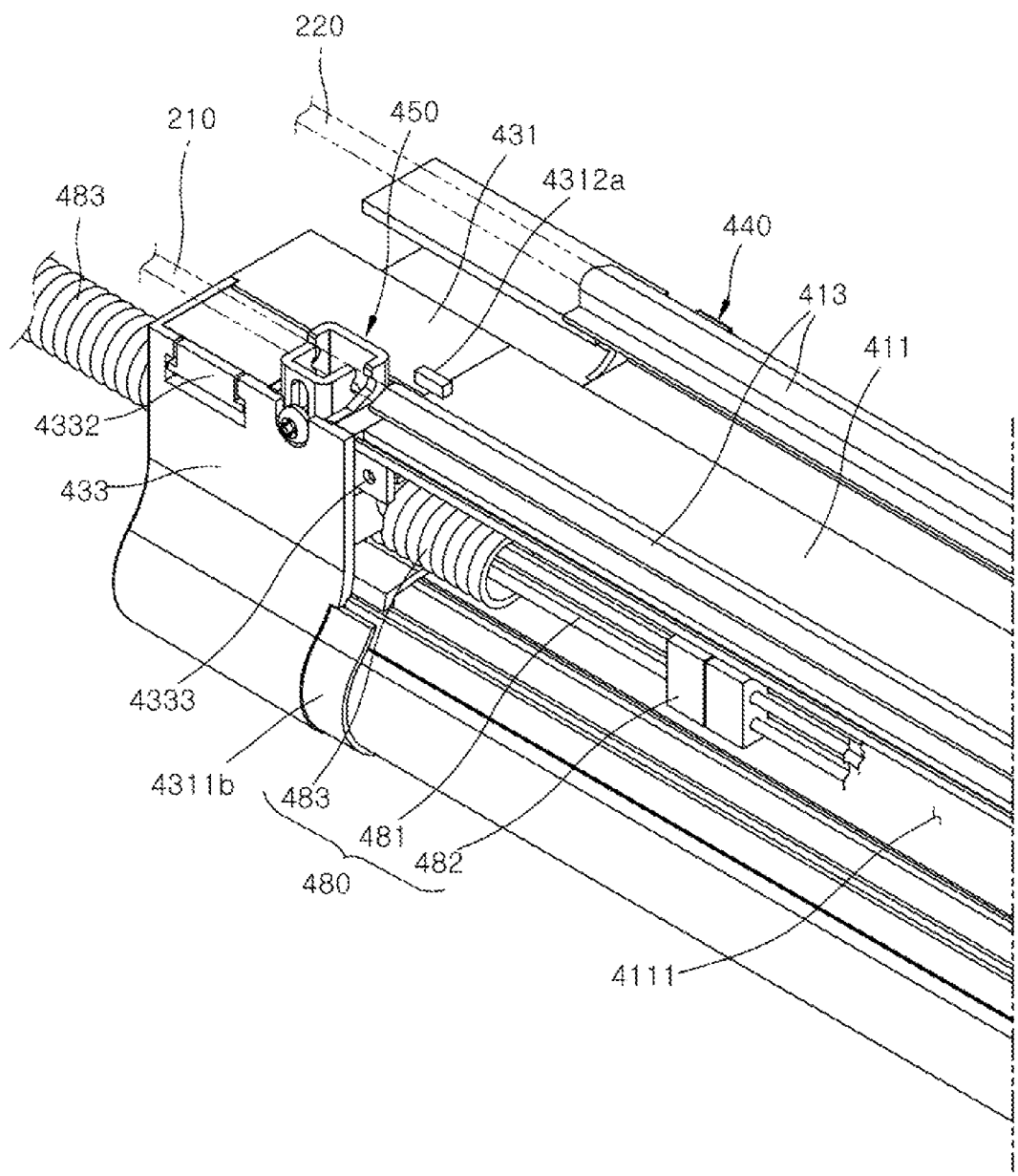

CATENARY EQUIPMENT AND CONSTRUCTION METHOD THEREOF

CROSS-REFERENCE TO RELATED APPLICATION

This application claims priority from Korean Patent Application Nos. 10-2016-0027065, filed on Mar. 7, 2016 and 10-2017-0011285, filed on Jan. 24, 2017 in the Korean Intellectual Property Office, the disclosure of which is incorporated herein by reference.

BACKGROUND OF THE INVENTION (a) Field of the Invention

The present invention relates to catenary equipment and a construction method thereof, and more particularly to catenary equipment installed in an interior space of a building and effectively withstanding earthquakes and a construction method thereof.

(b) Description of the Related Art

In general, a raceway refers to a kind of wiring duct commonly installed for electric wiring at an exposed ceiling of a parking lot, a machinery room or the like in a large building. The raceway is installed on a floor plate, a wall, a ceiling, etc. as it is exposed.

For example, a hanger is anchored on an interior ceiling, and the raceway is hung up on a lower end of the hanger. Thus, the hanger supports the load of the raceways.

However, a conventional installation structure of the raceway has a problem that the hanger may be pulled out from the ceiling or the raceway may be separated from the hanger due to intense vibrations since it cannot absorb vibrations when the vibrations such as earthquakes occur.

Further, it is difficult to change the position of the raceway while arranging the raceway since the raceway is connected depending on the positions of the hanger.

SUMMARY OF THE INVENTION

Accordingly, the present invention is conceived to solve the conventional problems, and an aspect of the present invention is to provide catenary equipment installed in an interior space of a building and effectively withstanding earthquakes and a construction method thereof.

In accordance with an embodiment of the present invention, there is provided catenary equipment including a pillar unit which comprises a first pillar member and a second pillar member to be arranged at regular intervals in an inner space of a building; a horizontal wire which is horizontally arranged in between the first pillar member and the second pillar member; a horizontal-wire holder unit which comprises a first horizontal wire holder installed on the first pillar member, and a second horizontal wire holder installed on the second pillar member; a horizontal-vibration absorbing member which is arranged in between the horizontal wire and the first horizontal wire holder and prevents vibrations of the pillar unit from being transmitted to the horizontal wire; a holding wire which holds the horizontal wire to prevent deflection of the horizontal wire; a ceiling holder which is installed at a ceiling of the building and holds a first end of the holding wire; a connection bracket which connects a second end of the holding wire and the horizontal wire; and an earthquake-proof lighting equipment assembly which is installed on the horizontal wire and couples with a lighting module for emitting light at one side thereof.

In accordance with an embodiment of the present invention, there is provided a construction method of catenary equipment, the method comprising: installing a first pillar member and a second pillar member at regular intervals in an inner space of a building; installing a first horizontal wire holder on the first pillar member, and installing a second horizontal wire holder on the second pillar member; installing a horizontal-vibration absorbing member to the first horizontal wire holder; installing a horizontal wire in between the horizontal-vibration absorbing member and the second horizontal wire holder; installing a ceiling holder at a ceiling of the building; installing a connection bracket on the horizontal wire; installing a holding wire in between the ceiling holder and the connection bracket; and installing an earthquake-proof lighting equipment assembly on the horizontal wire.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 1 is a view showing an embodiment of catenary equipment according to the present invention;

FIG. 2 is a partial enlarged plan view of an area A of FIG. 1;

FIG. 3 is a partial enlarged plan view of an area B of FIG. 1;

FIG. 4 illustrates an enlarged view (a) of an area C of FIG. 1, and a lateral view (b) of the enlarged view (a);

FIG. 5 illustrates an enlarged view (a) of an area D of FIG. 1, and a lateral view (b) of the enlarged view (a);

FIG. 6 is an overhead view of an earthquake-proof lighting equipment assembly of FIG. 1;

FIG. 7 is a flowchart showing a construction method of the catenary equipment according to an embodiment of the present invention;

FIG. 8 is a view showing another embodiment of catenary equipment according to the present invention;

FIG. 9 is an exploded perspective view of an earthquake-proof lighting equipment assembly according to an embodiment of the present invention;

FIG. 10 is an exploded cross-section view of an earthquake-proof lighting equipment main body in the earthquake-proof lighting equipment assembly according to an embodiment of the present invention;

FIG. 11 is an exploded perspective view of an earthquake-proof lighting equipment socket in the earthquake-proof lighting equipment assembly according to an embodiment of the present invention; and FIG. 12 is an enlarged view showing that the earthquake-proof lighting equipment assembly is installed according to an embodiment of the present invention.

DETAILED DESCRIPTION OF THE EMBODIMENTS

Hereinafter, embodiments of catenary equipment and a construction method thereof according to the present invention will be described with reference to the accompanying drawings. The following embodiments are not construed as limiting the present invention. Further, detailed descriptions about the publicly known functions or structures may be omitted for clarity.

Referring to FIG. 1 to FIG. 6, an exemplary embodiment of catenary equipment will be described.

According to an embodiment of the present invention, the catenary equipment includes an earthquake-proof lighting equipment assembly 400 installed in an interior of a building, e.g. a space of a basement. According to an embodiment of the present invention, the catenary equipment is installed so that the earthquake-proof lighting equipment assembly 400 can withstand earthquakes or the like vibrations.

The catenary equipment includes a pillar unit, a horizontal wire 200, a horizontal-wire holder unit, a horizontal-vibration absorbing member, a holding wire 300, a ceiling holder 560, a connection bracket 600, and the earthquake-proof lighting equipment assembly 400. Further, the catenary equipment includes a wire-vibration absorbing member 550, a tension adjusting unit, and a horizontal-wire height adjusting unit 900.

The pillar unit includes a first pillar member 110 and a second pillar member 120 which are arranged at regular intervals in an interior space of a building 1. The pillar unit is hung up on the ceiling of the building 1.

Here, a first pillar member 110 includes a first end anchored on the ceiling of the building 1, and a second end arranged as a free end in an interior space of the building 1. Likewise, a second pillar member 120 includes a first end anchored on the ceiling of the building 1, and a second end provided as a free end.

The first pillar member 110 and the second pillar member 120 are installed without connecting the ceiling and the floor of the building 1, thereby reducing system installation costs and improving resistance to earthquakes in various directions.

The first pillar member 110 and the second pillar member 120 are shaped like a metal rod having a circular or a polygonal cross-section, but not limited thereto and may be an angle member having an L-shaped cross section.

The horizontal wire 200 connects the first pillar member 110 and the second pillar member 120 to be arranged in the interior space of the building 1.

The horizontal wire 200 includes a first horizontal wire 210, and a second horizontal wire 220 arranged in parallel with the first horizontal wire 210. The horizontal wire 200 forms two rows and is horizontally arranged in between the first pillar member 110 and the second pillar member 120.

In this embodiment of the present invention, the horizontal wire 200 includes two wires, i.e. the first horizontal wire 210 and the second horizontal wire 220, but not limited thereto. Alternatively, the number of wires included in the horizontal wire 200 may be changed variously. For instance, at least one pair of horizontal wires 200 may be arranged in parallel with each other in between the first pillar member 110 and the second pillar member 120. In other words, at least one pair of horizontal wires 200 may be arranged being spaced apart from each other in between the first pillar member 110 and the second pillar member 120.

As a member of the horizontal wire 200, a wire rope may be employed.

However, the present invention is not limited to the wire rope, and the member of the horizontal wire 200 may be replaced by a member having a flexible structure capable of absorbing vibrations.

The horizontal-wire holder unit is coupled to the pillar unit so as to couple the pillar unit and the horizontal wire 200. The horizontal-wire holder unit includes a first horizontal wire holder 710 installed on the first pillar member 110, and a second horizontal wire holder 720 installed on the second pillar member 120.

The first horizontal wire holder 710 and the second horizontal wire holder 720 are respectively locked to the first pillar member 110 and the second pillar member 120 and support the horizontal wire 200, the horizontal-vibration absorbing member and the tension adjusting unit so as to prevent the horizontal wire 200 from moving up and down.

The height at which the first horizontal wire holder 710 and the second horizontal wire holder 720 are installed relative to the ground is determined depending on the installation height of the earthquake-proof lighting equipment assembly 400.

Although it is not shown, the first horizontal wire holder 710 and the second horizontal wire holder 720 are respectively fastened to the first pillar member 110 and the second pillar member 120 by separate fasteners.

The horizontal-vibration absorbing member is arranged in between the horizontal wire 200 and the horizontal-wire holder unit and prevents vibrations from being transmitted between the pillar unit and the horizontal wire 200. The horizontal-vibration absorbing member prevents vibrations from being transited to the horizontal wire 200 when the pillar unit vibrates due to the vibrations of the building.

The horizontal-vibration absorbing member includes a first end coupled to the first horizontal wire holder 710, and the second end coupled to the horizontal wire 200.

Specifically, the horizontal-vibration absorbing member includes a first horizontal-vibration absorbing member 510 arranged in between the first horizontal wire holder 710 and the first horizontal wire 210, and a second horizontal-vibration absorbing member 520 arranged in between the first horizontal wire holder 710 and the second horizontal wire 220.

In this embodiment of the present invention, the horizontal-vibration absorbing member employs a spring damper, but not limited thereto. Alternatively, the horizontal-vibration absorbing member may employ any member as long as it has a structure for absorbing vibrations.

The holding wire 300 connects the inner wall of the building 1 and the horizontal wire 200. The holding wire 300 has a first end coupled to the inner wall of the building 1 via the ceiling holder 560, and a second end coupled to the horizontal wire 200 via the wire-vibration absorbing member. In result, the holding wire 300 holds the horizontal wire 200 in order to prevent deflection of the horizontal wire 200.

As a member of the holding wire 300, a wire rope may be employed.

However, the present invention is not limited to the wire rope, and the member of the holding wire 300 may be replaced by a member having a flexible structure capable of absorbing vibrations.

The ceiling holder 560 is installed in the inner wall of the building 1 so as to couple the inner wall of the building 1 and the holding wire 300. The ceiling holder 560 is installed on the ceiling of the building 1 and holds the first end of the holding wire 300.

Here, the ceiling holder 560, the holding wire 300, the wire-vibration absorbing member 550, the horizontal-wire height adjusting unit 900, the connection bracket 600 and the horizontal wire 200 are connected in sequence.

The connection bracket 600 connects the holding wire 300 and the horizontal wire 200. The connection bracket 600 includes a first plate 610, and a second plate 620 arranged on the first plate 610. Between the first plate 610 and the second plate 620, a space for accommodating the horizontal wire 200 may be formed. Further, at least one of the first plate 610 and the second plate 620 may be formed with a space for accommodating the horizontal wire 200.

At least one pair of horizontal wires 200 is arranged in between the first plate 610 and the second plate 620, and the connection bracket 600 simultaneously locks the at least one of horizontal wires 200.

The first plate 610 and the second plate 620 may be respectively formed with through holes (not shown), and thus first ends of height adjusting bolts 911 (to be described later) penetrate the through holes. Then, a top gap adjusting nut 915a (to be described later) is arranged on the top of the second plate 620, and a bottom gap adjusting nut 915b (to be described later) is arranged on the bottom of the first plate 610.

The earthquake-proof lighting equipment assembly 400 is coupled to the horizontal wire 200. The earthquake-proof lighting equipment assembly 400 is installed and supported on the horizontal wire 200. An upper region of the earthquake-proof lighting equipment assembly 400 is coupled to the horizontal wire 200, and a lower region of the earthquake-proof lighting equipment assembly 400 is coupled to a lighting module 420.

Here, one side of the upper region of the earthquake-proof lighting equipment assembly 400 is fitted to the first horizontal wire 210, and the other side is fitted to the second horizontal wire 220, so that the earthquake-proof lighting equipment assembly 400 can be hung up on the horizontal wire 200.

The earthquake-proof lighting equipment assembly 400 will be described in detail through the earthquake-proof lighting equipment assembly (to be described later) according to an embodiment of the present invention.

The tension adjusting unit is arranged in between the horizontal wire 200 and the horizontal-wire holder unit and adjusts the tension of the horizontal wire 200. The tension adjusting unit is arranged in between at least one holder of the first horizontal wire holder and the second horizontal wire holder 720 and the horizontal wire 200 and adjusts the tension of the horizontal wire 200.

The tension adjusting unit is arranged in between the second horizontal wire holder 720 and the horizontal wire 200 and adjusts the tension of the horizontal wire 200. The tension adjusting unit includes a first tension adjusting member 530 arranged in between the first horizontal wire 210 and the second horizontal wire holder 720, and a second tension adjusting member 540 arranged in between the second horizontal wire 220 and the second horizontal wire holder 720.

The first tension adjusting member 530 and the second tension adjusting member 540 have substantially the same structure, and thus the first tension adjusting member 530 will be representatively described.

The first tension adjusting member 530 includes a bolt member 531 having a first side coupling with the first horizontal wire 210 and a second side penetrating the second horizontal wire holder 720, and a nut member 533 supported on the second horizontal wire holder 720 and moving the bolt member 531 as being screw-coupled to the bolt member 531.

The wire-vibration absorbing member 550 is arranged in between the holding wire 300 and the connection bracket 600. The wire-vibration absorbing member 550 prevents the vibration of the holding wire 300 from being transmitted to the horizontal wire 200.

In this embodiment of the present invention the wire-vibration absorbing member 550 employs the spring damper, but not limited thereto. Alternatively, any member having a structure capable of absorbing the vibration may be employed as the wire-vibration absorbing member 550.

In result, the horizontal-vibration absorbing member and the wire-vibration absorbing member 550 are installed at the points of holding the horizontal wire 200, so that the vibration can be maximally prevented from being transmitted to the horizontal wire 200 where the earthquake-proof lighting equipment assembly 400 is installed, thereby protecting the earthquake-proof lighting equipment assembly 400 from earthquakes.

The horizontal-wire height adjusting unit 900 adjusts a space between the horizontal wire 200 and the inner wall of the building 1.

The horizontal-wire height adjusting unit 900 is arranged in between the wire-vibration absorbing member 550 and the connection bracket 600. The horizontal-wire height adjusting unit 900 adjusts the space between the horizontal wire 200 and the inner wall of the building 1. The horizontal-wire height adjusting unit 900 adjusts the height of the horizontal wire 200.

The horizontal-wire height adjusting unit 900 includes an absorbing member connector 920 coupled to the wire-vibration absorbing member 550, and a space adjuster 910 having a first end coupled to the absorbing member connector 920 and a second end coupled to the connection bracket 600 and adjusting the space between the connection bracket 600 and the absorbing member connector 920.

The space adjuster 910 includes the height adjusting bolt 911 penetrating the absorbing member connector 920, a locking unit 913 arranged on the opposite side of the head of the height adjusting bolt 911 with respect to the absorbing member connector 920 and locking the absorbing member connector 920, and a gap adjusting nut 915 arranged on the top and bottom surfaces of the connection bracket 600 penetrated by the height adjusting bolt 911 and locking the connection bracket 600.

For example, to adjust the space between the connection bracket 600 and the absorbing member connector 920, a worker loosens a top gap adjusting nut 915a placed on the top of the connection bracket 600, moves the connection bracket 600 in an upper direction while a bottom adjusting nut 915b placed on the bottom of the connection bracket 600 is adjusted to move in an upper lengthwise direction of the height adjusting bolt 911, and then adjusts the top gap adjusting nut 915a to thereby lock the connection bracket 600.

In result, if the connection bracket 600 moves upward, the horizontal wire 200 coupled to the connection bracket 600 also moves upward, thereby adjusting the height of the horizontal wire 200.

Here, if the top gap adjusting nut 915a and the bottom gap adjusting nut 915b are tightened while moving toward the connection bracket 600, both the first plate 610 and the second plate 620 are locked by the space adjuster 910, i.e. the gap adjusting nut 915.

Of course, the present invention is not limited thereto. Alternatively, the wire-vibration absorbing member 550 may be not used. For example, the horizontal-wire height adjusting unit 900 may be arranged in between the holding wire 300 and the connection bracket 600 and adjust the height of the horizontal wire.

Referring to FIG. 1 to FIG. 7, a construction method of the catenary equipment according to the present invention is as follows.

First, a worker installs the first pillar member 110 and the second pillar member 120 at regular intervals in the inner space of the building (S10).

Next, the worker installs the first horizontal wire holder 710 on the first pillar member 110, and installs the second horizontal wire holder 720 on the second pillar member 120 (S20).

Of course, the present invention is not limited thereto. Alternatively, the first pillar member 110 and the second pillar member 120 may be installed in the inner space of the building 1 after installing the first horizontal wire holder 710 and the second horizontal wire holder 720 to the first pillar member 110 and the second pillar member 120.

Next, the worker installs the horizontal-vibration absorbing member to the first horizontal wire holder 710 (S30).

Next, the worker installs the tension adjusting unit to the second horizontal wire holder 720. Alternatively, the order of installing the horizontal-vibration absorbing member and the tension adjusting unit may be reversed.

Next, the worker installs the horizontal wire 200 between the horizontal-vibration absorbing member and the tension adjusting unit (S40). Alternatively, if the tension adjusting unit is not used, the horizontal wire 200 may be installed in between the horizontal-vibration absorbing member and the second horizontal wire holder 720.

However, the present invention is not limited thereto. Alternatively, the worker may respectively install the first horizontal wire holder 710 and the second horizontal wire holder 720 to the first pillar member 110 and the second pillar member 120, install the horizontal-vibration absorbing member and the tension adjusting unit, install the horizontal wire 200, and then install the first pillar member 110 and the second pillar member 120 to the inner space of the building 1.

Next, the worker installs the ceiling holder 560 at the ceiling of the building 1 (S50). Alternatively, the ceiling holder 560 may be installed before installing the pillar unit, or may be installed regardless of the installation of the first horizontal wire holder 710, the horizontal-vibration absorbing member and the horizontal wire 200.

Next, the worker installs the connection bracket 600 on the horizontal wire 200 (S60). Alternatively, the installation of the connection bracket 600 may be performed at any time so long as it is after installing the horizontal wire 200.

Next, the worker installs the horizontal-wire height adjusting unit 900 to the connection bracket 600 so as to adjust the height of the horizontal wire 200

Next, to prevent the vibration from being transmitted from the holding wire 300 to the horizontal wire 200, the worker installs the wire-vibration absorbing member 550 to the horizontal-wire height adjusting unit 900 before installing the holding wire 300 (S70).

Next, the worker installs the holding wire 300 between the ceiling holder 560 and the connection bracket 600 (S80). Here, the holding wire 300 has the first end coupled to the ceiling holder 560 and the second end coupled to the wire-vibration absorbing member 550.

Alternatively, the worker may install the wire-vibration absorbing member 550 and the horizontal-wire height adjusting unit 900 after installing the holding wire 300.

Next, the earthquake-proof lighting equipment assembly 400 is installed on the horizontal wire 200 (S90). Even after the earthquake-proof lighting equipment assembly 400 is installed, the tension of the horizontal wire 200 may be adjusted by the tension adjusting unit, and the height of the horizontal wire 200 may be adjusted by the horizontal-wire height adjusting unit 900.

Referring to FIG. 8, another embodiment of catenary equipment according to the present invention will be described.

Elements of the catenary equipment according to this embodiment of the present invention are similar to the elements of the catenary equipment according to the foregoing embodiment of the present invention. However, on the contrary to the pillar unit in the catenary equipment according to the foregoing embodiment of the present invention, the pillar unit in the catenary equipment according to this embodiment of the present invention includes the first pillar member 810 and the second pillar member 820 which are installed in between the ceiling and the floor of the building 1 and support the horizontal wire 200. Here, the first pillar member 810 and the second pillar member 820 are fastened to the ceiling and the floor of the building by separate fasteners.

Referring to FIG. 9 to FIG. 12, the earthquake-proof lighting equipment assembly 400 according to an embodiment of the present invention may include an earthquake-proof lighting equipment main body 410 and an earthquake-proof lighting equipment socket 430, and further includes a wire locking unit. Further, the earthquake-proof lighting equipment assembly 400 according to this embodiment of the present invention may further include a power supply unit 460. In addition, the earthquake-proof lighting equipment assembly 400 according to this embodiment of the present invention may further include a lighting control unit 470. Further, the earthquake-proof lighting equipment assembly 400 according to an embodiment of the present invention may further include a cable unit 480.

The earthquake-proof lighting equipment main body 410 includes a wire coupling portion 4131 in which the horizontal wire 200 to be arranged in the inner space of the building 1 is inserted and supported, and a lighting coupling portion 4121 to which a lighting module 420 for emitting light is coupled. Here, the lighting module 420 may include a lighting substrate longitudinally formed along the lengthwise direction of the earthquake-proof lighting equipment main body and coupled to the lighting coupling portion 4121, and a plurality of light emitting diode (LED) lamps arranged on the lighting substrate and emitting light.

The earthquake-proof lighting equipment main body 410 may include a main body frame 411 longitudinally formed along the lengthwise direction of the horizontal wire 200, a lighting coupling frame 412 protruding from the main body frame 411, and a wire coupling frame 413 spaced apart from the lighting coupling frame 412 and protruding from the main body frame 411.

The main body frame 411 has a seat space 4111. The power supply unit 460 may be placed in the seat space 4111. Further, the cable unit 480 may be placed in the seat space 4111. In addition to the cable unit 480, a communication line or an additional electric wire may be placed in the seat space 4111. Further, the lighting control unit 470 may be placed in the seat space 4111, and thus the seat space 4111 may include a substrate mounting portion 4314 to which the lighting control unit 470 will be mounted. Due to the seat space 4111, it is easy to perform wiring work, maintenance and a check.

The main body frame 411 may be formed with a seat supporting portion 4112 in which a space opening/closing frame 415 is seated, and a main-body fitting portion 4113 to which a space opening/closing frame 415 to be described later is fitted.

The lighting coupling frame 412 may be formed with the lighting coupling portion 4121.

The lighting coupling portion 4121 may have lateral sides opened along the lengthwise direction of the lateral sides of the lighting module 420 and facing with each other, so that the lighting module 420 can slide to couple with or separate from the lighting coupling frame 412.

In result, the lighting coupling portion 4121 is provided in the earthquake-proof lighting equipment main body 410, and thus there are no needs of an additional element for installing the lighting module 420, thereby shortening a construction time without disassembling and assembling procedures.

The wire coupling frame 413 may be formed with the wire coupling portion 4131. The wire coupling frames 413 may form a pair corresponding to the horizontal wire 200. In the pair of wire coupling frames 413, the wire coupling portions 4131 are opened in opposite directions, thereby stabilizing the coupling between the horizontal wire 200 and the wire coupling frame 413 and preventing the horizontal wire 200 from being separated from the wire coupling portion 4131. If the wire coupling portions 4131 of the wire coupling frames 413 are opened in the same direction, it is convenient to couple the wire coupling frame 413 and the horizontal wire 200.

The earthquake-proof lighting equipment main body 410 may further include the space opening/closing frame 415 detachably coupled to the main body frame 411 so as to open and close the seat space 4111.

The space opening/closing frame 415 may slide to couple with or separate from the main body frame 411. Thus, the space opening/closing frame 415 is easily detached/attached to facilitate the maintenance of the units arranged inside the seat space 4111.

The space opening/closing frame 415 may be formed with a support rib 4151 to be supported on the main body frame 411, and a cover fitting portion 4152 to be fitted to the main body frame 411.

Thus, the support rib portion 4151 is supported on the seat supporting portion 4112 formed in the main body frame 411, and the cover fitting portion 4152 is fitted to the main-body fitting portion 4113, thereby detachably mounting the space opening/closing frame 415 to the main body frame 411.

The support rib portion 4151 and the cover fitting portion 4152 are formed at the edges of the space opening/closing frame 415 along the lengthwise direction of the space opening/closing frame 415, and the seat supporting portion 4112 and the main-body fitting portion 4113 are formed at the edges of the seat space 4111 along the lengthwise direction of the main body frame 411.

The space opening/closing frame 415 may be formed with the unit supporter 4153 protruding for supporting the power supply unit 460 installed in the seat space 4111. The unit supporter 4153 is longitudinally formed along the lengthwise direction of the space opening/closing frame 415, and protrudes from the space opening/closing frame 415 toward the seat space 4111.

The earthquake-proof lighting equipment main body 410 may further include a cover coupling frame 414 protruding from the main body frame 411, and a lighting protection cover 416 detachably coupled to the cover coupling frame 414. The cover coupling frame 414 is arranged being spaced apart from the lighting coupling frame 412 and the wire coupling frame 413. The lighting protection cover 416 diffuses light emitted from the lighting module 420, and protects the lighting module 420 from an external shock.

The lighting protection cover 416 may be formed to couple with and separate from the cover coupling frame 414 by sliding. Thus, it is easy to do maintenance of the lighting module 420 since the lighting protection cover 416 is easily attached to and detached from the cover coupling frame 414.

The lighting protection cover 416 may be formed with hooking supporters 4161 at opposite lateral ends with respect to its lengthwise direction. Further, the cover coupling frame 414 may be formed with hook coupling portions 4142 to which the hooking supporters 4161 are detachably hooked.

The lighting protection cover 416 is coupled to the cover coupling frame 414 and surrounds the lighting module 420 to thereby form a diffusing space 4141. At this time, the main body frame 411 is narrower than the lighting protection cover 416 with respect to a direction perpendicular to the lengthwise direction of the earthquake-proof lighting equipment main body 410, and it is thus possible to diversify a diffusing direction of light and uniformly emit the light in the inner space of the building. In other words, as shown in FIG. 10, the lighting protection cover 416 may protrude in the widthwise direction of the main body frame 411.

Since the power supply unit 460 and the lighting module 420 are arranged at different sections, heat generated in the lighting module 420 is not directly transferred to the power supply unit 460, thereby increasing the lifespan of the power supply unit 460 and reducing power consumption of the lighting module 420.

The earthquake-proof lighting equipment socket 430 is coupled to the lengthwise opposite ends of the earthquake-proof lighting equipment main body 410 in the lengthwise direction of the horizontal wire 200.

The earthquake-proof lighting equipment socket 430 may include a socket body portion 431 fitted to the earthquake-proof lighting equipment main body 410, a through portion 432 formed to penetrate the socket body portion 431 along the lengthwise direction of the earthquake-proof lighting equipment main body 410 and communicating with the seat space 4111, and a detachable member 433 rotatably coupled to the socket body portion 431 so as to open and close the through portion 432.

Here, the socket body portion 431 may include a socket rib portion protruding to be fitted to the earthquake-proof lighting equipment main body 410, and a fitting support portion protruding to be spaced from the socket rib portion so as to support the earthquake-proof lighting equipment main body 410 supported on the socket rib portion. Further, the socket body portion 431 may include a detachable supporter 4313 to hold the detachable member 433. Further, the socket body portion 431 is provided as a hollow recessed body, and the socket body portion 431 may include a substrate mounting portion 4314 in which the lighting control unit 470 is seated and supported.

The socket rib portion may include a first socket rib portion 4311*a* protruding to be fitted to the main body frame 411, and a second socket rib portion 4311*b* protruding to be fitted to the lighting protection cover 416.

The fitting support portion may include a first fitting support portion 4312*a* protruding as it is spaced from the first socket rib portion 4311*a* in order to support the main body frame 411 supported on the first socket rib portion 4311*a*, and a second fitting support portion 4312*b* protruding as it is spaced from the second socket rib portion 4311*b* in order to support the lighting protection cover 416 supported on the second socket rib portion 4311*b*.

With the foregoing features of the socket rib portion and the fitting support portion, the earthquake-proof lighting equipment sockets 430 are stably fitted to both ends of the earthquake-proof lighting equipment main body 410, respectively.

The detachable member 433 may include a detachable hook 4331 to be hooked to the detachable supporter 4313.

Further, the detachable member 433 may be formed with a coupling protrusion 4332 for supporting a conduit 483 of the cable unit 480 to be seated in the through portion 432. The coupling protrusion 4332 may be fitted with a concavo-convex structure formed in the conduit 483 of the cable unit 480.

Further, the detachable member 433 may have a fastening bracket 4333 formed to protrude. Then, the fastening bracket 4333 is detachably fastened to the space opening/closing frame 415 by a connection member 4334, thereby improving the coupling between the earthquake-proof lighting equipment main body 410 and the earthquake-proof lighting equipment socket 430. The connection member 4334 may be achieved by a screw or bolt for fastening the fastening bracket 4333 and the space opening/closing frame 415.

Although it is not shown, the through portion 432 may be formed with a conduit locker (not shown) protruding to support the conduit 483 of the cable unit 480, thereby preventing the conduit 483 of the cable unit 480 seated in the through portion 432 from moving.

The wire locking unit keeps the horizontal wire 200 inserted in the wire coupling portion 4131. The wire locking unit may further include at least one among a first wire locking unit 440, a second wire locking unit 450 and a third wire locking unit (not shown).

The first wire locking unit 440 is coupled to the earthquake-proof lighting equipment main body 410. The first wire locking unit 440 prevents the horizontal wire 200 from separating from the wire coupling portion 4131.

The first wire locking unit 440 prevents at least one of the first horizontal wire 210 and the second horizontal wire 220 from separating from the wire coupling portion 4131. In this embodiment of the present invention the first wire locking unit 440 prevents the second horizontal wire 220 from separating from the wire coupling portion 4131 as shown in FIG. 12.

The first wire locking unit 440 may include an elastic locking portion 441 supported on the earthquake-proof lighting equipment main body 410, an elastic transformation portion 442 bent from the elastic locking portion 441, and a coupling member 443 detachably coupling the elastic locking portion 441 with the earthquake-proof lighting equipment main body 410. The elastic transformation portion 442 is elastically transformed at the elastic locking portion 441 as the horizontal wire 200 is inserted in and removed from the wire coupling portion 4131. Then, the elastic transformation portion 442 is supported on the wire coupling frame 413, and elastically transformed to be in contact with or separated from the wire coupling frame 413 as the horizontal wire 200 is inserted in and removed from the wire coupling portion 4131.

The coupling member 443 may be achieved by a screw or bolt for screw-coupling the earthquake-proof lighting equipment main body 410 and the elastic locking portion 441.

The second wire locking unit 450 is coupled to the earthquake-proof lighting equipment socket 430. The second wire locking unit 450 holds the horizontal wire 200. The second wire locking unit 450 may hold at least one of the first horizontal wire 210 and the second horizontal wire 220. The second wire locking unit 450 may hold the first horizontal wire 210 as shown in FIG. 12.

The second wire locking unit 450 includes a first wire holding member 451 coupled to the earthquake-proof lighting equipment socket 430, a second wire holding member 452 arranged to face with the first wire holding member 451, and a fastening member 453 detachably coupling the second wire holding member 452 with the first wire holding member 451. Since the fastening member 453 detachably couples the second wire holding member 452 with the first wire holding member 451, it is possible to hold the horizontal wire 200 inserted in between the first wire holding member 451 and the second wire holding member 452. The fastening member 453 may be achieved by a screw or bolt for screw-coupling the first wire holding member 451 and the second wire holding member 452.

At least one of the first wire holding member 451 and the second wire holding member 452 may be formed with a wire receiving groove 4501 recessed to receive the horizontal wire 200. In this embodiment of the present invention the wire receiving grooves 4501 may be recessed to face with each other in the first wire holding member 451 and the second wire holding member 452, respectively. Further, the second wire holding member 452 may be formed with a member adjusting hole 4521 in which the fastening member 453 is movable.

The third wire locking unit (not shown) is rotatably coupled to the earthquake-proof lighting equipment socket 430. The third wire locking unit (not shown) locks the horizontal wire 200 to the earthquake-proof lighting equipment socket 430. The third wire locking unit (not shown) may hold and lock both the first horizontal wire 210 and the second horizontal wire 220 to the earthquake-proof lighting equipment socket 430. The third wire locking unit (not shown) may include a rotary shaft for forming a rotary center with respect to the earthquake-proof lighting equipment socket 430, and a locking hook for coupling with the earthquake-proof lighting equipment socket 430. The earthquake-proof lighting equipment socket 430 may be formed with a hook receiver to which the locking hook is detachably hooked. The locking hook (not shown) may be achieved by the detachable hook 4331 (to be described later), and the hook receiver (not shown) may be achieved by the detachable supporter 4313 (to be described later).

The power supply unit 460 couples with the earthquake-proof lighting equipment main body 410 or the earthquake-proof lighting equipment socket 430 and supplies power to the lighting module 420. In this embodiment of the present invention the power supply unit 460 may be coupled to the seat space 4111 provided in the earthquake-proof lighting equipment main body 410. The power supply unit 460 may uses a switching transistor or the like to convert alternating current (AC) power into direct current (DC) power. The power supply unit 460 may be achieved by a switched mode power supply (SMPS). With this, it is possible to not only reduce the size of the power supply unit 460 and thus minimize the size of the seat space 4111, but also fully secure a space where the power supply unit 460 and the cable unit 480 are arranged in the seat space 4111.

The lighting control unit 470 is coupled to the earthquake-proof lighting equipment main body 410 or the earthquake-proof lighting equipment socket 430 and generates a preset pulse corresponding to light emitted from the lighting module 420.

The lighting control unit 470 may include a circuit board 471 coupled to the earthquake-proof lighting equipment main body 410 or the earthquake-proof lighting equipment socket 430, a moving-object sensor 472 coupled to the circuit board 471 and generating a preset pulse with respect to supplied power, and a functional switch 473 selecting whether to apply the preset pulse in between the moving-object sensor 472 and the lighting module 420.

The moving-object sensor 472 may generate a preset pulse by sensing a moving object in the inner space of the building 1. As the moving-object sensor 472 senses an object, the functional switch 473 applies the preset pulse to the lighting module 420 so that the lighting module 420 can emit light.

The circuit board 471 transfers the supplied power to the moving-object sensor 472 or the functional switch 473.

The lighting control unit 470 may further include an indication lamp 474 for indicating an operation state of the moving-object sensor 472 in accordance with power supplied to the circuit board 471. The indication lamp 474 may indicate the state of the power supplied to the circuit board 471.

The lighting control unit 470 may further include a moving-object sensing window 475 coupled to the moving-object sensor 472 and exposed to the inner space of the building 1.

In accordance with light transmitted to the moving-object sensor 472 through the moving-object sensing window 475, a preset pulse is adjusted to thereby control the brightness of light emitted from the lighting module 420.

The lighting control unit 470 controls the brightness of the light emitted toward the inner space of the building 1. The lighting control unit 470 may serve as electrical ballast for preventing an overcurrent from flowing in the lighting module 420.

The cable unit 480 is seated in the seat space 4111 and transmits power to the lighting module 420. The cable unit 480 may include an electric wire 481 through which power is supplied to the lighting module 420, an electric wire connector 482 for connecting the neighboring electric wires 481, and the conduit 483 supported on the earthquake-proof lighting equipment socket 430 and surrounding the electric wire 481. In addition, the cable unit 480 may further include a communication line for wired or wireless communication.

The conduit 483 surrounds at least a part of the electric wire 481. The conduit 483 penetrates the earthquake-proof lighting equipment assembly 400. The conduit 483 is locked to the earthquake-proof lighting equipment assembly 400 by the earthquake-proof lighting equipment socket 430. The conduit 483 may be made of a flexible material.

The conduit 483 may be achieved by a flexible pipe. Since the conduit 483 is achieved by a lightweight and flexible pipe, it is possible to easily and safely install the conduit 483.

Further, the flexible pipe employed as the conduit 483 is relatively inexpensive as compared with that made of metal and aluminum used in the conventional duct construction, thereby reducing construction costs.

Further, the concavo-convex structure may be formed on the outer surface of the conduit 483. Since the conduit 483 is locked to the earthquake-proof lighting equipment assembly 400 by the concavo-convex structure formed at the outer surface thereof, there are no needs of an additional coupling member and thus disassembling and assembling procedures are omitted to thereby shorten a construction time.

In the foregoing catenary equipment and the construction method thereof, the horizontal-vibration absorbing member and the wire-vibration absorbing member 550 are installed at the points of holding the horizontal wire 200, so that the vibration can be maximally prevented from being transmitted to the horizontal wire 200 where the earthquake-proof lighting equipment assembly 400 is installed, thereby protecting the earthquake-proof lighting equipment assembly 400 from earthquakes.

Further, according to the present invention, the horizontal wire 200 is used in installing the earthquake-proof lighting equipment assembly 400, and it is thus possible to not only more simply install and construct the earthquake-proof lighting equipment system than the conventional one but also achieve appropriate procedure distribution at a work field and high-quality construction.

Further, it is possible to stabilize the coupling state of the horizontal wire 200 in the earthquake-proof lighting equipment assembly 400 and prevent the horizontal wire 200 from being separated from the earthquake-proof lighting equipment assembly 400.

Further, it is easy to attach or detach the horizontal wire 200 in the earthquake-proof lighting equipment assembly 400, and it is also possible to stably lock and conveniently hold the horizontal wire 200.

Further, the space opening/closing frame 415 is detachably mounted in the earthquake-proof lighting equipment assembly 400, and it is thus possible to provide easy maintenance and quick and convenient construction.

Further, the earthquake-proof lighting equipment main body 410 and the earthquake-proof lighting equipment socket 430 are easily fitted, and the earthquake-proof lighting equipment socket 430 is stably supported at both ends of the earthquake-proof lighting equipment main body 410.

Further, it is possible to adjust the power supplied to the lighting module 420, and it is also possible to control the brightness in the inner space of the building 1.

Further, the installation and the maintenance are easy since a space where the power supply unit 460 and the electric wire 481 are arranged is secured in the earthquake-proof lighting equipment assembly 400.

Further, it is easy to attach and detach the cable unit 480 in the earthquake-proof lighting equipment assembly 400 since the conduit 483 where the electric wire 481 is installed is flexible.

Further, the earthquake-proof lighting equipment assembly 400 is not entirely but partially arranged on the horizontal wire 200, thereby reducing costs of materials.

Further, if the earthquake-proof lighting equipment main body 410, the earthquake-proof lighting equipment socket 430, the power supply unit 460 and the cable unit 480 are manufactured in a lump for the earthquake-proof lighting equipment assembly 400, there are no needs of additional coupling procedures between the elements, thereby shortening a construction time.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. Catenary equipment comprising:
a pillar unit which comprises a first pillar member and a second pillar member to be arranged at regular intervals in an inner space of a building;
a horizontal wire which is horizontally arranged in between the first pillar member and the second pillar member;
a horizontal-wire holder unit which comprises a first horizontal wire holder installed on the first pillar member, and a second horizontal wire holder installed on the second pillar member;
a horizontal-vibration absorbing member which is arranged in between the horizontal wire and the first horizontal wire holder and prevents vibrations of the pillar unit from being transmitted to the horizontal wire;
a holding wire which holds the horizontal wire to prevent deflection of the horizontal wire;

a ceiling holder which is installed at a ceiling of the building and holds a first end of the holding wire;

a connection bracket which connects a second end of the holding wire and the horizontal wire; and an earthquake-proof lighting equipment assembly which is installed on the horizontal wire and couples with a lighting module for emitting light at one side thereof.

2. The catenary equipment according to claim 1, further comprising a wire-vibration absorbing member which is arranged in between the connection bracket and the holding wire and prevents vibrations of the holding wire from being transmitted to the horizontal wire.

3. The catenary equipment according to claim 1, further comprising a horizontal-wire height adjusting unit which is arranged in between the holding wire and the connection bracket and adjusts height of the horizontal wire.

4. The catenary equipment according to claim 1, further comprising a tension adjusting unit which is arranged in between at least one of the first horizontal wire holder and the second horizontal wire holder and the horizontal wire, and adjusts tension of the horizontal wire.

5. The catenary equipment according to claim 1, wherein the horizontal wire comprises
a first horizontal wire; and
a second horizontal wire arranged in parallel with the first horizontal wire, and
the horizontal-vibration absorbing member comprises
a first horizontal-vibration absorbing member arranged in between the first horizontal wire holder and the first horizontal wire; and
a second horizontal-vibration absorbing member arranged in between the first horizontal wire holder and the second horizontal wire.

6. The catenary equipment according to claim 1, wherein the first pillar member has a first end anchored on the ceiling of the building, and a second end provided as a free end and arranged in the inner space of the building.

7. The catenary equipment according to claim 1, wherein the earthquake-proof lighting equipment assembly comprises
an earthquake-proof lighting equipment main body which comprises a wire coupling portion in which the horizontal wire is inserted and supported, and a lighting coupling portion to which the lighting module is coupled;
an earthquake-proof lighting equipment socket which is coupled to opposite ends of the earthquake-proof lighting equipment main body in a lengthwise direction of the horizontal wire; and
a wire locking unit which keeps the horizontal wire inserted in the wire coupling portion.

8. The catenary equipment according to claim 2, further comprising a horizontal-wire height adjusting unit which is arranged in between the wire-vibration absorbing member and the connection bracket,
wherein the horizontal-wire height adjusting unit comprises an absorbing member connector coupling with the wire-vibration absorbing member; and a space adjuster having a first end coupling with the absorbing member connector and a second end coupling with the connection bracket to adjust a space between the connection bracket and the absorbing member connector.

9. The catenary equipment according to claim 7, wherein the wire locking unit comprises at least one of:

a first wire locking unit coupled to the earthquake-proof lighting equipment main body to prevent the horizontal wire from being separated from the wire coupling portion;
a second wire locking unit coupled to the earthquake-proof lighting equipment socket to hold the horizontal wire; and
a third wire locking unit rotatably coupled to the earthquake-proof lighting equipment socket to lock the horizontal wire.

10. The catenary equipment according to claim 7, wherein the earthquake-proof lighting equipment main body comprises
a main body frame longitudinally formed along a lengthwise direction of the horizontal wire and having a seat space;
a lighting coupling frame protruding from the main body frame and formed with the lighting coupling portion; and
a wire coupling frame protruding from the main body frame and formed with the wire coupling portion.

11. The catenary equipment according to claim 7, wherein the earthquake-proof lighting equipment socket comprises
a socket body portion fitted to the earthquake-proof lighting equipment main body;
a through portion formed in the socket body portion along a lengthwise direction of the earthquake-proof lighting equipment main body to communicate with a seat space of the earthquake-proof lighting equipment main body; and
a detachable member rotatably coupled to the socket body portion to open and close the through portion.

12. The catenary equipment according to claim 7, wherein the earthquake-proof lighting equipment assembly further comprises
a lighting control unit coupled to the earthquake-proof lighting equipment main body or the earthquake-proof lighting equipment socket and generating a preset pulse corresponding to light emitted from the lighting module.

13. The catenary equipment according to claim 8, wherein the connection bracket comprises
a first plate; and
a second plate arranged on the first plate,
the horizontal wire forms at least one pair and the pair of horizontal wires are arranged to be spaced apart from each other in between the first plate and the second plate, and
the connection bracket simultaneously locks the at least one pair of horizontal wires.

14. The catenary equipment according to claim 9, wherein the first wire locking unit comprises
an elastic locking portion supported on the earthquake-proof lighting equipment main body;
an elastic transformation portion bent from the elastic locking portion and elastically transformed from the elastic locking portion as the horizontal wire is inserted in and removed from the wire coupling portion; and
a coupling member detachably coupling the elastic locking portion with the earthquake-proof lighting equipment main body.

15. The catenary equipment according to claim 9, wherein the second wire locking unit comprises
a first wire holding member coupled to the earthquake-proof lighting equipment socket;
a second wire holding member arranged to face with the first wire holding member; and a fastening member detachably coupling the second wire holding member with the first wire holding member to hold the horizontal wire inserted in between the first wire holding member and the second wire holding member.

16. The catenary equipment according to claim 10, wherein the earthquake-proof lighting equipment main body further comprises a space opening/closing frame detachably coupled to the main body frame so that the seat space can be opened and closed.

17. The catenary equipment according to claim 10, wherein the earthquake-proof lighting equipment main body comprises
 a cover coupling frame protruding from the main body frame; and
 a lighting protection cover detachably coupled to the cover coupling frame and surrounding the lighting module to form a diffusing space.

18. The catenary equipment according to claim 15, wherein at least one of the first wire holding member and the second wire holding member is formed with a wire receiving groove recessed to receive the horizontal wire.

19. A construction method of catenary equipment, the method comprising:
 installing a first pillar member and a second pillar member at regular intervals in an inner space of a building;
 installing a first horizontal wire holder on the first pillar member, and installing a second horizontal wire holder on the second pillar member;
 installing a horizontal-vibration absorbing member to the first horizontal wire holder;
 installing a horizontal wire in between the horizontal-vibration absorbing member and the second horizontal wire holder;
 installing a ceiling holder at a ceiling of the building;
 installing a connection bracket on the horizontal wire;
 installing a holding wire in between the ceiling holder and the connection bracket; and
 installing an earthquake-proof lighting equipment assembly on the horizontal wire.

20. The method according to claim 19, further comprising:
 installing a wire-vibration absorbing member to the connection bracket before installing the holding wire to prevent vibrations of the holding wire from being transmitted to the horizontal wire,
 wherein the holding wire has a first end coupled to the ceiling holder and a second end coupled to the wire-vibration absorbing member.

\* \* \* \* \*